US005416774A

United States Patent [19]

Shigematsu et al.

[11] Patent Number: 5,416,774

[45] Date of Patent: May 16, 1995

[54] DIGITAL BROADCAST RECEIVER

[75] Inventors: Seiji Shigematsu, Tokyo; Susumu Morioka, Saitama, both of Japan

[73] Assignee: Sony Corporation, Tokyo, Japan

[21] Appl. No.: 82,174

[22] Filed: Jun. 24, 1993

[30] Foreign Application Priority Data

Jun. 25, 1992 [JP] Japan .......... 4-190131

[51] Int. Cl.[6] .......... H04J 1/00

[52] U.S. Cl. .......... 370/69.1; 370/73

[58] Field of Search .......... 370/110.1, 79, 69.1, 370/73; 348/700, 10, 16, 467; 455/3.1, 3.2, 4.1, 4.2, 6.3, 180.1, 185.1, 186.1, 186.2, 184.1

[56] References Cited

U.S. PATENT DOCUMENTS 4,710,972 12/1987 Hayashi et al. .......... 455/3.2
5,003,591 3/1991 Kauffman et al. .......... 455/4.1
5,105,268 4/1992 Yamanouchi et al. .......... 348/10
5,278,988 1/1994 Dejean et al. .......... 455/185.1

FOREIGN PATENT DOCUMENTS 3126880 1/1983 Germany .
3146466 9/1983 Germany .
3242580 9/1984 Germany .
62-294332 12/1987 Japan .

OTHER PUBLICATIONS

IEEE 1989 International Conference on Consumer Electronics, Jun. 9, 1989, DSR-Receiver for Digital Sound Broadcasting via the European Satellites TVsat/TDF.

*Primary Examiner*—Douglas W. Olms
*Assistant Examiner*—Ajit Patel
*Attorney, Agent, or Firm*—Pasquale Musacchio; Jerry A. Miller

[57] ABSTRACT

A digital broadcast receiver comprising frequency specifying element for specifying a receive frequency (frequency block), content type specifying element for specifying a broadcast content type, and control element for controlling signal reception with a specified receive frequency and controlling such that a digital broadcast having a specified broadcast (program) content is identified among and selected from a plurality of digital broadcast signal according to a set of broadcast content type information. The control element, when a changed receive frequency is specified by the frequency specifying element, controls the signal reception with the new receive frequency and, if a broadcast content had been specified by the content type specifying element before the receive frequency was changed, controls such that a digital broadcast signal with the broadcast content specified by the content type specifying element is selected from a plurality of digital broadcast signals received at the new receive frequency.

4 Claims, 10 Drawing Sheets

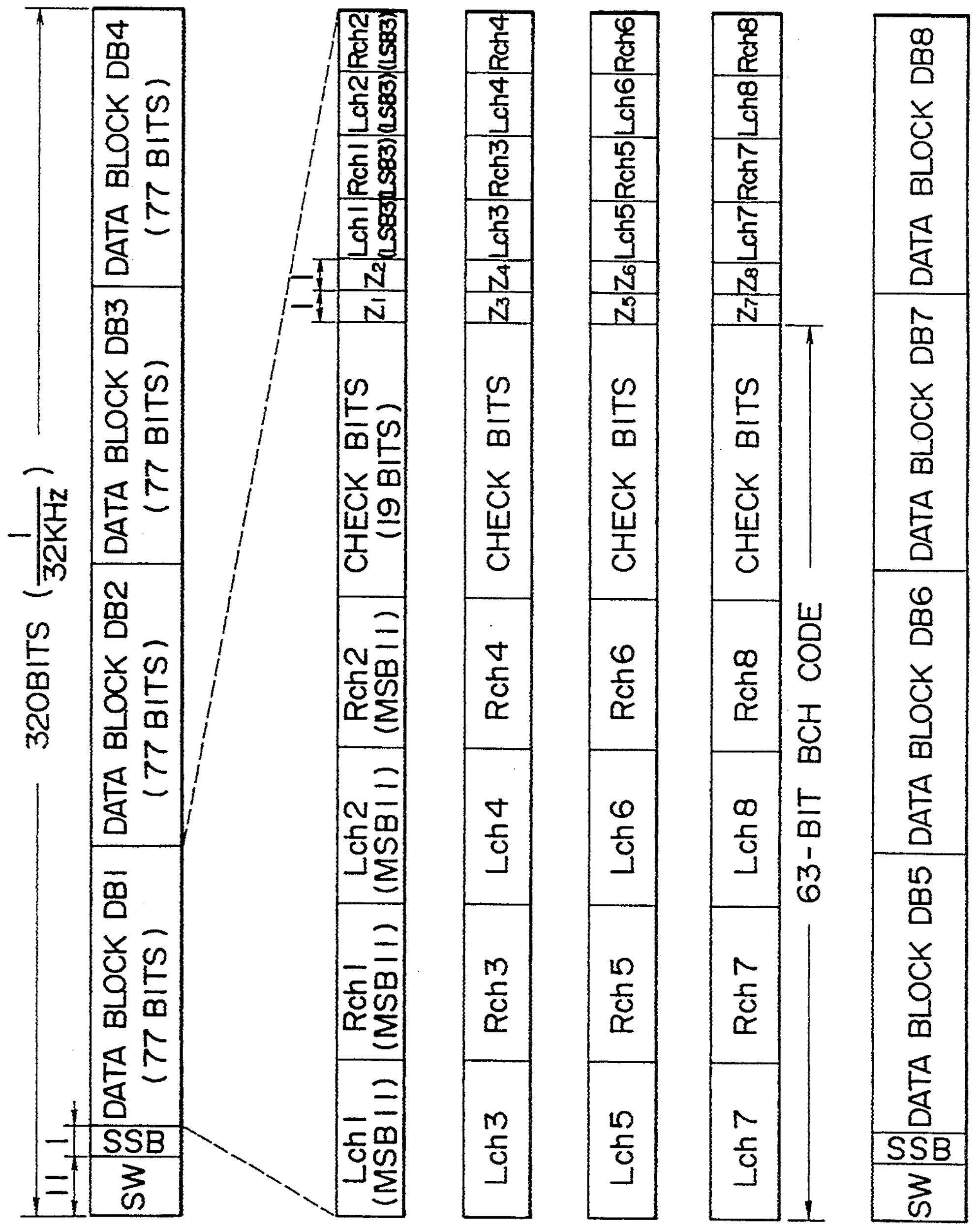
MAIN FRAME DATA STRUCTURE
FIG. 4(a) MAIN FRAME MA (I DATA)
FIG. 4(b) DATA BLOCK DB1
FIG. 4(c) DATA BLOCK DB2
FIG. 4(d) DATA BLOCK DB3
FIG. 4(e) DATA BLOCK DB4
FIG. 4(f) MAIN FRAME MB (Q DATA)

DIGITAL BROADCAST RECEIVER

BACKGROUND OF THE INVENTION

Field of the Invention

The present invention relates to a digital broadcast receiver for receiving broadcast of signals of speech and the like in the form of digital data.

Description of the Related Art

With the recent advancement in digitization of transmitted signals, there has been realized even radio broadcasting in digital signals. As one of these systems, there is developed a digital satellite radio (hereinafter called DSR) system. In the DSR system, broadcast signals in digital data from a plurality of broadcasting stations (for example 16 stations for stereo broadcasting, or 32 stations for monaural broadcasting) are time-division multiplexed and subjected to QPSK modulation processing, and thereafter the signals are output over a frequency band of 12 GHz to a broadcasting satellite.

An electric wave from the broadcasting satellite is received through satellite broadcast antennas installed in a centralized receiving station (for example CATV station), installed individually in homes, etc., and supplied, through a broadcast cable or directly from the satellite broadcast antenna, to a DSR receiver and demodulated therein so that the radio broadcast sound signal is output.

Since, as described above, broadcast signals from for example 16 broadcasting stations are multiplexed in one receive frequency (hereinafter called "frequency block"), the DSR receiver is adapted to be able not only to select a frequency block (tuning) but also to select one digital broadcast signal from the selected digital broadcast signals of the channels of 16 stations (channel selection). Accordingly, it is made possible for the users to receive a desired broadcast channel by performing the tuning operation and the channel selecting operation.

In the DSR system, various data are added to the broadcast sound data, such as that indicating the type of broadcast content of each of multiplexed digital broadcast signals (e.g., news, sports, rock music, and classical music; hereinafter called program type information), that indicating discrimination among stereo broadcast/monaural broadcast/sound multiplex broadcast (hereinafter called "channel mode information"), that indicating discrimination between music broadcast and speech broadcast such as sound of voice (hereinafter called M/S mode information), and the like. On the DSR receiver side, it is possible to make various signal reception controlling operation using such information.

In a DSR receiver in general, it is arranged such that, when its frequency block is changed to another frequency block by user's operation, the first channel of the new frequency block is forcedly selected out of channels of its 16 broadcasting stations. (Although, there are 32 stations in the case of monaural broadcast, hereinafter it will be assumed for simplicity that the broadcasting stations multiplexed in one frequency block are 16 stations all for stereo broadcast.)

When the above described program type information is used, if the user designates a desired type of program content, for example "NEWS", in his DSR receiver, the DSR receiver automatically searches the received 16 stations for a channel broadcasting a news program (the broadcast channel whose program type information indicates "news") and selects the channel and outputs its broadcast news program. While such an operation is possible, if it is arranged such that, when the frequency block is changed, the first channel is forcedly selected, it frequently occurs that a broadcast different from the program specified by the user is output because the first channel does not always broadcast for example a news program.

In such case, the user has to select his desired channel by listening to each channel while changing the channels one by one, or has to make an operation anew to specify "NEWS" as the program content, and thus there has been a problem that users have to make such a troublesome operation.

Further, for the user to receive a broadcast of another content of program while he designated a specific program content can confuse the user in operating his receiver.

SUMMARY OF THE INVENTION

The present invention was made in view of the above mentioned problems. Accordingly, it is an object of the present invention to improve operability of a digital broadcast receiver receiving digital broadcast, in which a plurality of digital broadcast signals are multiplexed in one frequency block and at least program type information, as additional information to each of the digital broadcast signals, is added to each digital broadcast signal.

The digital broadcast receiver according to the present invention comprises frequency specifying means for specifying a receive frequency (frequency block), content type specifying means for specifying a broadcast content type, and control means for controlling signal reception with a specified receive frequency and controlling such that a digital broadcast having a specified broadcast (program) content is identified among and selected from a plurality of digital broadcast signal according to a set of broadcast content type information.

The control means, when a changed receive frequency is specified by the frequency specifying means, controls the signal reception with the new receive frequency and, if a broadcast content had been specified by the content type specifying means before the receive frequency was changed, controls such that a digital broadcast signal with the broadcast content specified by the content type specifying means is selected from a plurality of digital broadcast signals received at the new receive frequency.

Further, the control means, when the receive frequency is changed and the signal reception is controlled with the new receive frequency and, then, if the digital broadcast signal with the broadcast content specified by the content type specifying means is absent in a plurality of digital broadcast signals within the newly received frequency block, controls such that any channel selecting operation is performed.

BRIEF DESCRIPTION OF THE DRAWINGS

FIG. 4, as embodied by FIGS. 4*a*, 4*b*, 4*c*, 4*d*, 4*e* and 4*f*, is a diagram explanatory of a main frame structure of a transmitted signal in the DSR system;

DESCRIPTION OF THE PREFERRED EMBODIMENTS

Below will be described first the DSR system and the structure of transmitted data and then a DSR receiver as an embodiment of the present invention.

Figure 1:
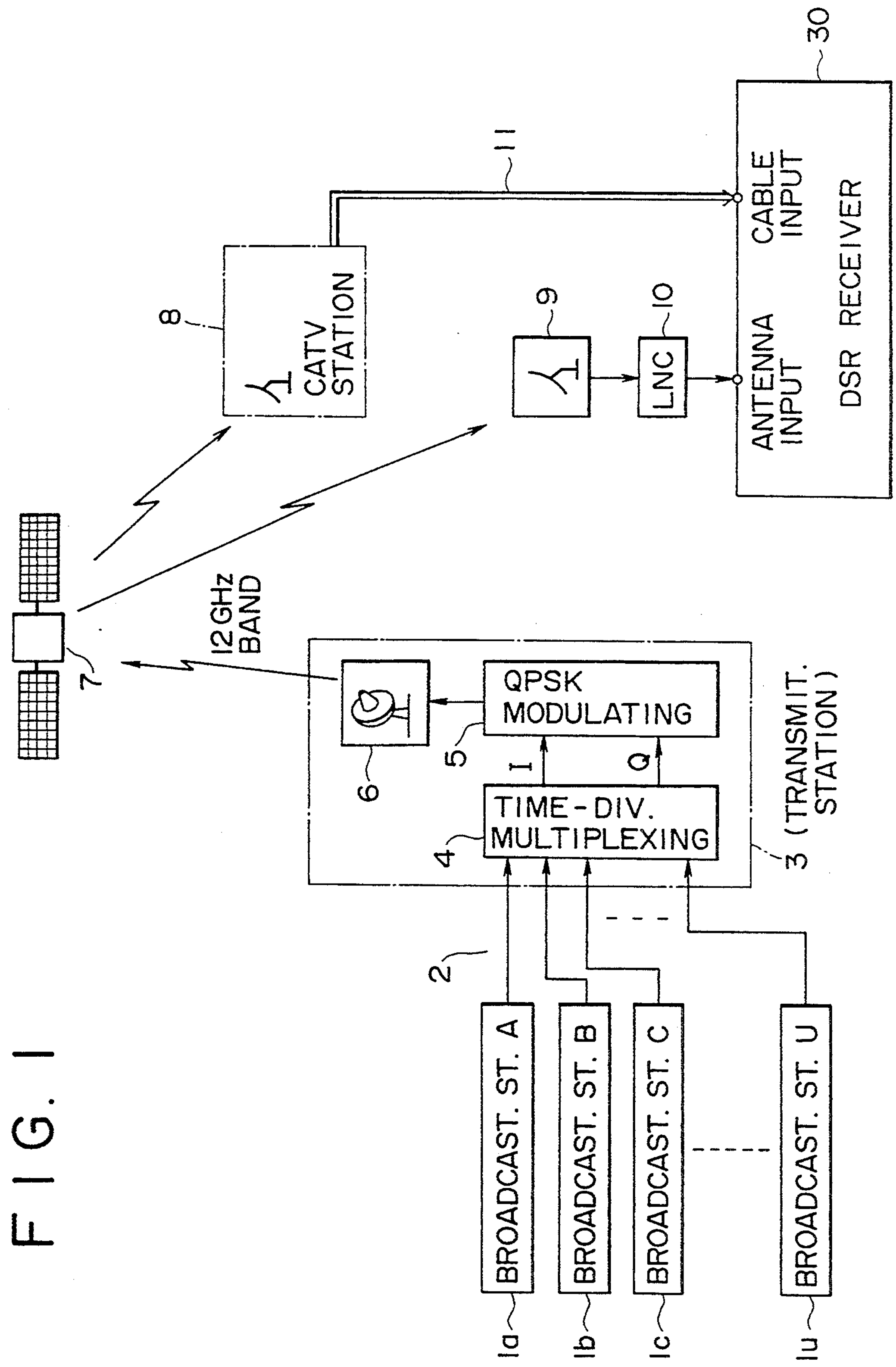
FIG. 1 is a diagram explanatory of the outline of a DSR system.

FIG. 1 is a diagram showing the outline of a DSR system. Reference numerals 1*a*–1*u* denote 16 broadcasting stations delivering stereo broadcasts. Each broadcasting station 1*a*–1*u* quantizes broadcast sound to 16-bit linear PCM digital data with a sampling frequency of 32 KHz, compresses the data into 14-bit data by near-instantaneous companding, and then outputs the compressed data. To this data are added, as the output data, various types of information such as program type information, channel mode information, and M/S mode information, and in addition, such codes as an error correcting code.

The 14-bit digital broadcast signal output from each broadcasting station 1*a*–1*u* is transmitted for example through a public line 2 to a transmitting station 3. The transmitting station 3 subjects the 16 channels of digital broadcast signals supplied thereto to a multiplexing process in its time-division multiplex processing portion 4 so that an I signal in which 8 channels are multiplexed and a Q signal in which 8 channels are multiplexed are generated. The I signal and Q signal are supplied to a QPSK modulation processing portion 5, and therein, a QPSK modulated signal with for example a bandwidth of 15 MHz is generated. The QPSK modulated signal is supplied to a transmitting antenna portion 6 and transmitted therefrom to a satellite 7.

Figure 2:
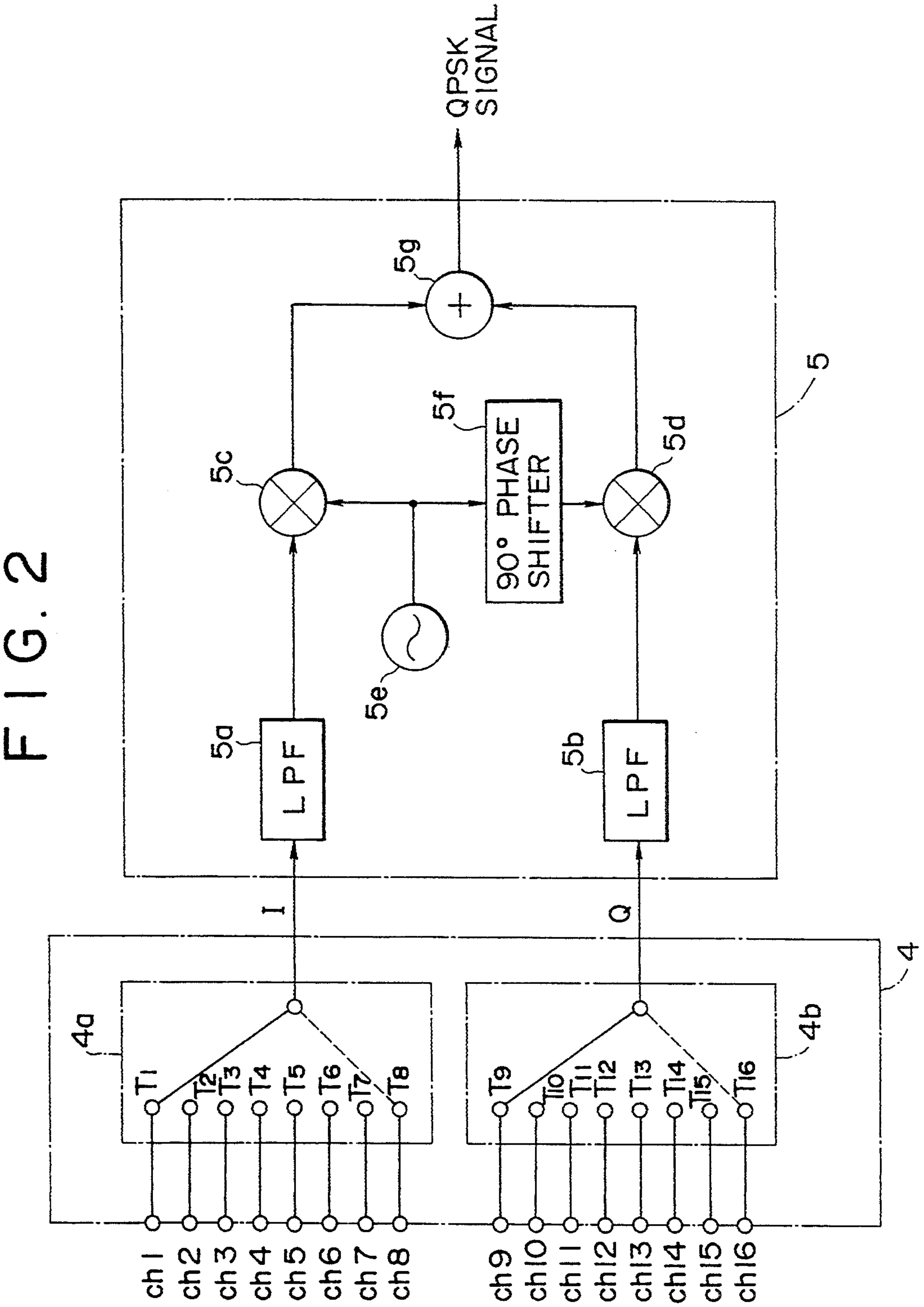
FIG. 2 is a diagram explanatory of a time-division multiplexing portion and a QPSK processing portion in the DSR system.

Arrangements of the time-division multiplex processing portion 4 and the QPSK modulation processing portion 5 are shown in FIG. 2.

Reference numerals 4*a*, 4*b* denote switching multiplexer circuits. The switching multiplexer circuit 4*a* is supplied with digital broadcast signals of channels ch1 to ch8 from broadcasting stations 1*a* to 1*h*at its contacts $T_1$ to $T_8$, respectively. By having these contacts $T_1$ to $T_8$ sequentially switched at regular timing, the digital broadcast signals of 8 channels are multiplexed and thereby the I signal is generated.

Figure 3A:
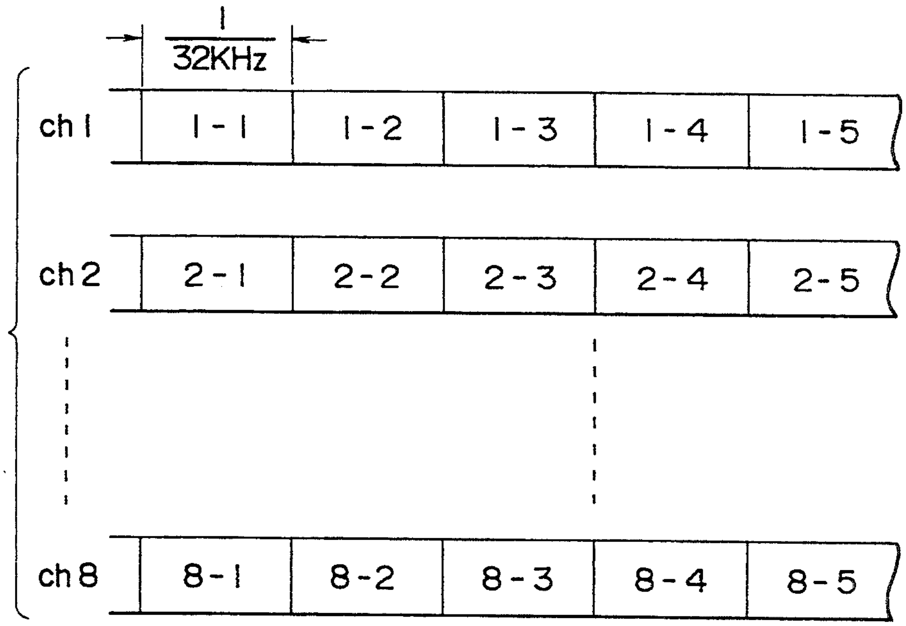
FIG. 3, as embodied by FIGS. 3*a*, 3*b* and 3*c*, is a diagram explanatory of a time-division multiplexing process in the DSR system.
Figure 3B:
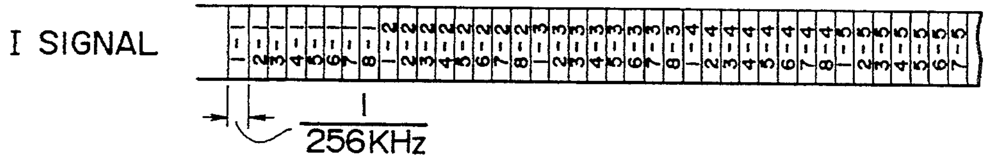
Figure 3C:
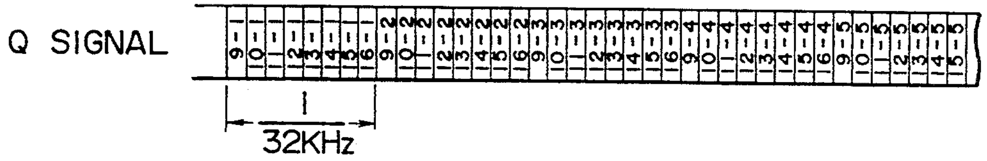

More specifically, while the data of the digital broadcast signals of channels ch1 to ch8 are supplied to the contacts $T_1$ to $T_8$ at intervals of 1/32 KHz as shown in FIG. 3(*a*), switching is performed at intervals of 1/256 KHz, and thereby, the multiplexed I signal as shown in FIG. 3(*b*) is generated.

On the other hand, in the switching multiplexer circuit 4*b*, the data of the digital broadcast signals of channels ch9 to ch16 coming from broadcasting stations 1i to 1u are supplied to the contacts $T_9$ to $T_{16}$ and connections at the contacts $T_9$ to $T_{16}$ are sequentially switched at intervals of 1/256 KHz as with the I signal, and thereby, the Q signal with 8 channels of digital broadcast signals multiplexed therein as shown in FIG. 3(*c*) is generated.

As shown in FIG. 2, the I signal is supplied through a low-pass filter 5*a* to an I multiplier 5*c* in the QPSK modulation processing portion 5. Meanwhile the Q signal is supplied through a low-pass filter 5*b* to a Q multiplier 5*d*. The I multiplier 5*c* is further supplied with a carrier at a predetermined frequency output from a carrier generator 5*e*, while the Q multiplier 5*d* is supplied with a carrier at the predetermined frequency output from the carrier generator 5*e* and then shifted in phase by 90° by a phase shifter 5*f*. Accordingly, the outputs of the I multiplier 5*c* and the Q multiplier 5*d* are mixed in a mixer 5*g*, and thereby, the so-called QPSK (Quadrature Phase Shift Keying) modulated signal is obtained.

The signal at 12 GHz band transmitted through the satellite 7 is received for example by a community reception equipment such as a CATV station 8 as shown in FIG. 1. It is also received by satellite broadcast receiving antennas 9 individually installed in homes and others.

The DSR signal received by the CATV station 8 is assigned to a predetermined channel frequency and transmitted over the so-called broadcasting cable 11 together with cable TV broadcast, FM broadcast, etc. and supplied for example to a DSR receiver 30 in each home. The frequency band of the transmitted signals over the broadcasting cable 11 is set to be 50–860 MHz and a band of 118 MHz out of which is used for one frequency block of the DSR signal.

The DSR broadcast signal received by a satellite broadcast receiving antenna 9 is converted by a low noise converter (LNC) 10 into a first intermediate-frequency signal and then input to a DSR receiver 30.

The transmitted data structure of the DSR broadcast signal as the I signal and Q signal will be described with reference to FIG. 4. The I signal and Q signal each have 8 channels of broadcast signals multiplexed therein as described above and each thereof has one unit of main frame $M_A$, $M_B$ formed of 320 bits (1/32 KHz) as shown in FIG. 4 (*a*) and FIG. 4(*f*).

Eleven bits at the head of each of the main frame $M_A$ and the main frame $M_B$ are assigned to a main frame sync signal SW and the following one bit is used as a service bit SSB.

The main frame $M_A$ is provided, in succession to the service bit SSB, with data blocks $DB_1$ to $DB_4$ each of which is formed of 77 bits. To each of the data blocks $DB_1$ to $DB_4$, two channels each of broadcast signals are assigned as shown in FIG. 4(*b*) to FIG. 4(*e*).

More specifically, the high-order 11 bits of the 14-bit L signal of the first channel ch1, the high-order 11 bits of the 14-bit R signal of the same, the high-order 11 bits of the 14-bit L signal of the second channel ch2, and the high-order 11 bits of the 14-bit R signal of the same are successively assigned to the data block $DB_1$ from its head, and in succession 19-bit check bits are assigned thereto. These 63 bits constitute a BCH code for error correction.

In succession to the above, additional bits $Z_1$ and $Z_2$, one bit each for the first and second channels, are assigned, and thereafter, the low-order three bits of the 14-bit L signal of the first channel ch1, the low-order three bits of the 14-bit R signal of the same, the low-order three bits of the 14-bit L signal of the second channel ch2, and the low-order three bits of the 14-bit R signal of the same are assigned. The 77-bit data block $DB_1$ is structured as described above.

In the similar format, information of the third and the fourth channels ch3 and ch4 is formed in the data block $DB_2$, information of the fifth and the sixth channels ch5 and ch6 is formed in the data block $DB_3$, and information of the seventh and the eighth channels ch7 and ch8 is formed in the data block $DB_4$.

Also for the main frame $M_B$ for the Q signal, though not shown, information of the channels ch9 to ch16 including check bits and others is assigned to the data blocks $DB_5$ to $DB_8$.

Figures 5A, 5B, 5C:
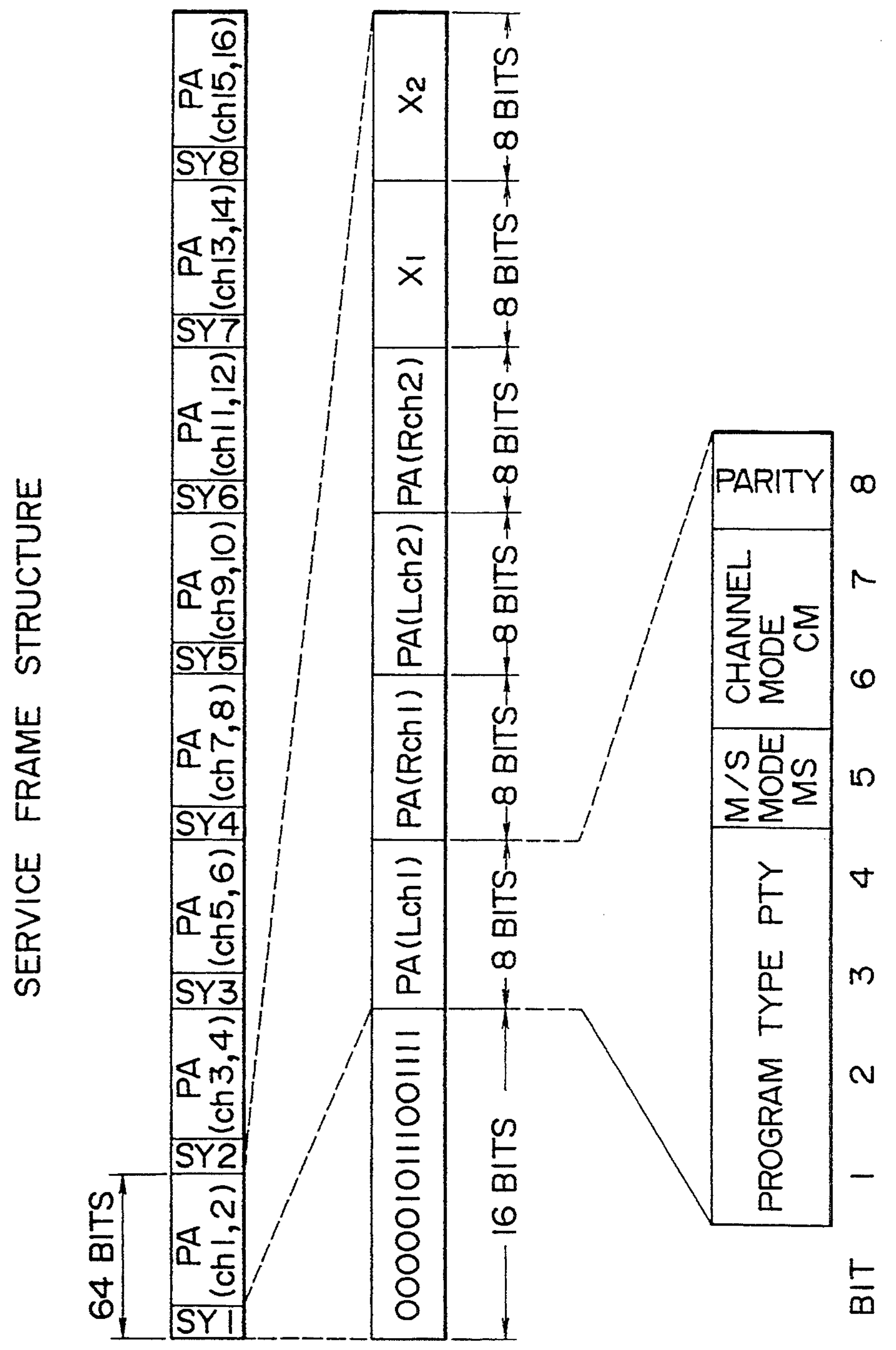
FIG. 5, as embodied by FIGS. 5*a*, 5*b* and 5*c*, is a diagram explanatory of a service frame structure transmitted in the DSR system.

Although there is provided only one bit of the service bit SSB in one main frame ($M_A$, $M_B$) here, the service bits SSB supplied at intervals of 1/32 KHz are collected in a DSR receiver 30 and thereby a service frame as shown in FIG. 5 is formed. By means of this service frame, the above described program type information PTY, channel mode information CM discriminating among stereo/monaural/sound multiplex, and M/S mode information MS discriminating between music/-speech in each broadcast of the received 16 channels can be identified. A service block having information for two channels as shown in FIG. 5(*a*) is formed of 64 bits of service bits SSB extracted from 64 units of successive mainframes $M_A$.

Sixteen bits at the head of the service block constitute a sync word $SY_1$ and, to the subsequent 48 bits, service information PA is given. More specifically, as shown in FIG. 5(*b*), eight bits each are assigned to service information PA (Lch1) for the L signal of the first channel ch1, service information PA (Rch1) for the R signal of the first channel ch1, service information PA (Lch2) for the L signal of the second channel ch2, and service information PA (Rch2) for the R signal of the second channel ch2. The remaining 16 bits $X_1$ and $X_2$ are kept as reserve bytes.

In the service frame, there are similarly formed, in succession to the service block for the channels ch1 and ch2, service blocks for the channels ch3 and ch4, . . . , channels ch15 and ch16, each comprising sync word SY ($SY_2$ to $SY_8$) and service information PA.

The eight bits of service information PA is formed of four bits of program type information PTY, one bit of M/S mode information MS, two bits of channel mode information CM, and one bit of parity as shown in FIG. 5(*c*).

By the four bits of program type information PTY, 16 types of broadcast contents can be recorded, such as news, current events, information program, sports, education, drama, culture, science, pop music, rock music, MOR music, and classical music.

In M/S mode information MS, music is identified by "1" while speech is identified by "0"

In the channel mode information CM, monaural broadcast is identified by for example "00". In the case where the first channel ch1 is that for stereo broadcast, the channel mode information CM in both the service information PA (Lch1) for the L signal and the service information PA (Rch1) for the R signal is used, i.e., when they are "01" and "01" the broadcast is identified as sound multiplex broadcast formed of independent monaural sounds, whereas when they are "01" and "10" the broadcast is identified as L, R stereo broadcast.

Structure of a DSR receiver according to the present embodiment corresponding to such DSR broadcasting system as described above will be described below with reference to FIG. 6 to FIG. 8.

Figure 6:
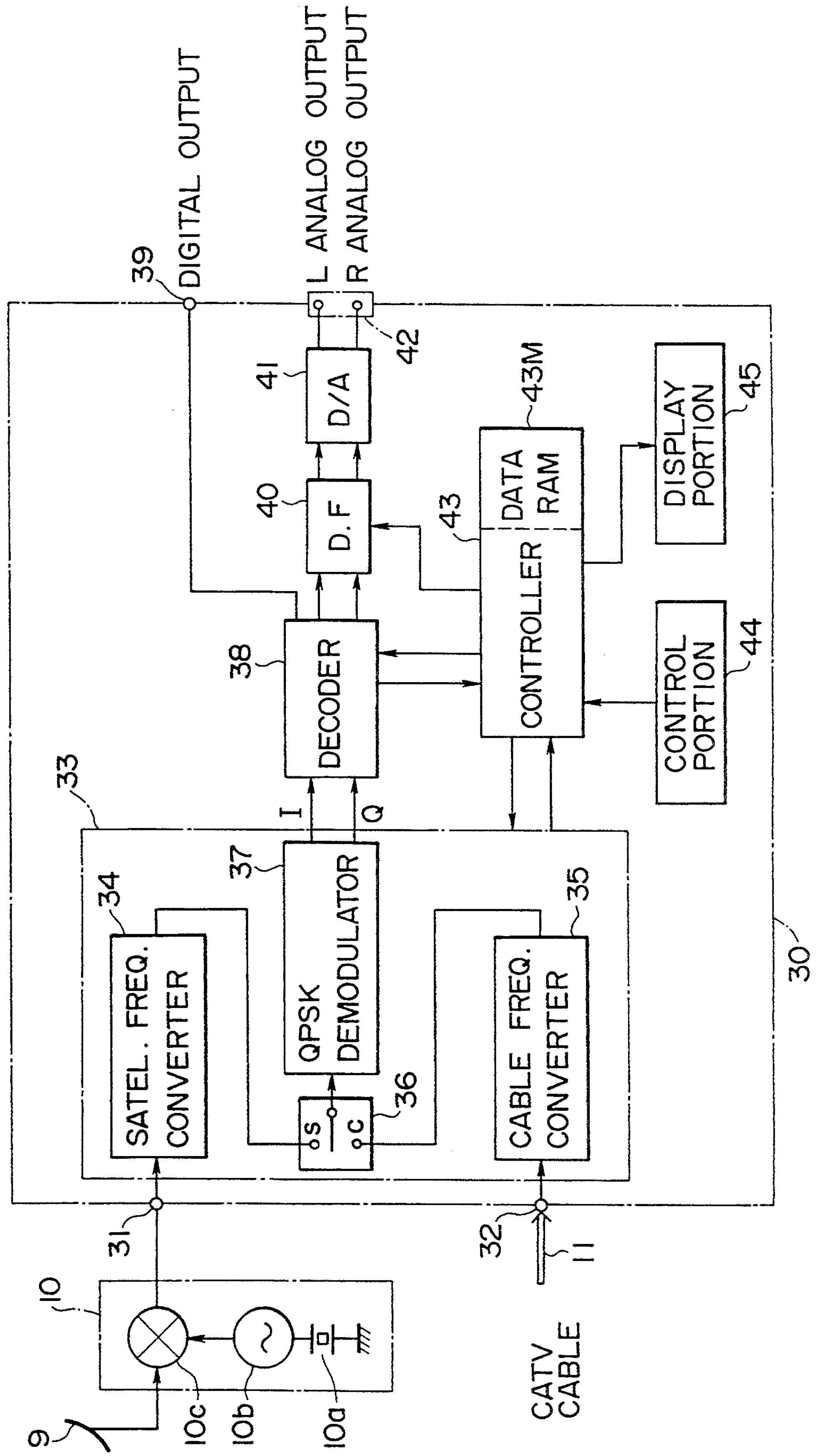
FIG. 6 is a block diagram showing structure of a DSR receiver of an embodiment of the invention.
Figure 7:
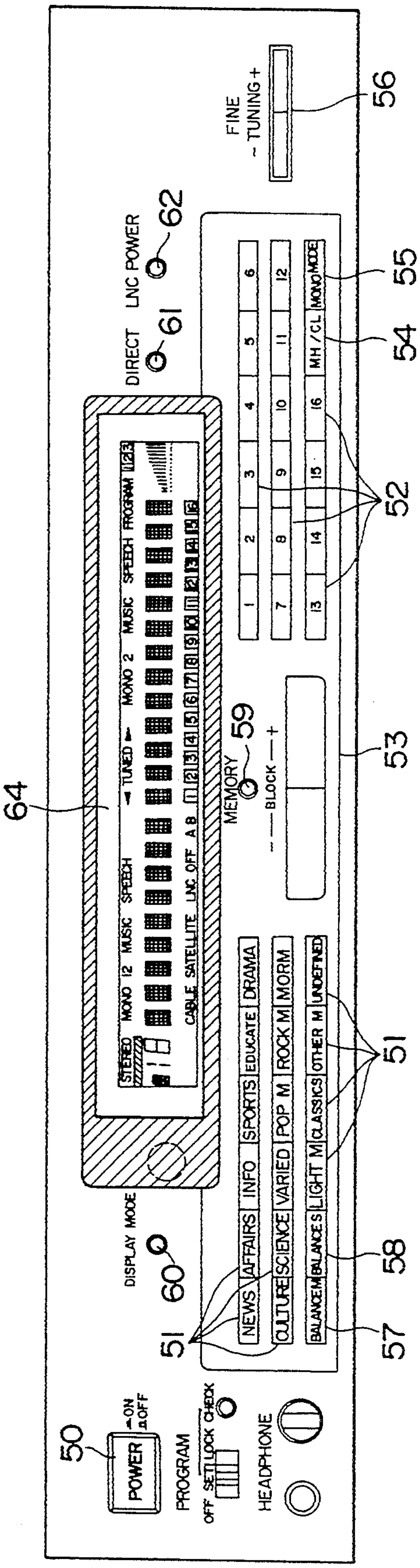
FIG. 7 is a front view of the front panel of the DSR receiver of the embodiment.

Referring to FIG. 6, reference numeral 31 denotes an antenna input terminal to which a DSR signal received by a satellite broadcast receiving antenna 9 is input through an LNC 10. The LNC 10 is formed of a resonator 10*a*, a local oscillator 10*b*, and a mixer circuit 10*c* and converts a signal at 12 GHz band to a first intermediate-frequency wave at 950–1750 MHz. On the other hand, reference numeral 32 denotes a cable input terminal which receives a DSR receive signal at 50 to 860 MHz.

The DSR receive signals from the input terminals 31 and 32 are supplied to a high-frequency portion 33. The DSR receive signal from the antenna input terminal 31 is input to a satellite frequency converter 34, and therein it is first converted to a second intermediate-frequency wave at 479.5 MHz and then converted to a third intermediate-frequency wave at 40 MHz, and thereafter supplied to an S contact of an input switching circuit 36. The DSR receive signal from the cable input terminal 32 is input to a cable frequency converter 35 and therein it is converted to an intermediate-frequency wave at 40 MHz and supplied to a C contact of the input switching circuit 36.

The DSR receive signal obtained from the satellite broadcast receiving antenna 9 or the broadcast cable 11 and converted to the intermediate-frequency wave at 40 MHz is supplied from the input switching circuit 36 to a QPSK demodulating portion 37 to be subjected to a QPSK demodulating process and, thereby, the above described I signal and Q signal are demodulated and output therefrom.

The I signal and Q signal in the format of the main frames $M_A$ and $M_B$ are discriminated in a decoder 38 according to the main frame sync signals SW, subjected to error correcting and decoding processes, and thereby, a broadcast of a specified channel is selected out of he time-division 1multiplexed 16 channels and output. The selected and output digital broadcast signal is output from an output terminal 39 in a digital form to another apparatus, or it is passed through a digital filter 40 and a D/A converter 41 and output from an output terminal 42 as L and R analog sound signals to a sound amplifier/output circuit portion, or another apparatus, to be output from speakers as broadcast sound. Meanwhile, service bits SSB extracted from the mainframes $M_A$ and $M_B$ in the decoder 38 are supplied to a controller 43.

The controller 43 is constituted of a microcomputer and controls various operations of the DSR receiver. Reference numeral 43M denotes an internal RAM for storing data used for the operation control. The controller 43 outputs control signals to various circuits in the high-frequency portion 33, i.e., a receive frequency (block selection) control signal to the satellite frequency converter 34 and the cable frequency converter 35 and a switching control signal to the input switching circuit 36.

The controller 43 further delivers a channel selection control signal to the decoder 38 to specify a selected channel. It further generates a service frame from service bits SSB supplied from the decoder 38 to obtain information therefrom on each of the 16 channels as described above. Furthermore, the controller 43, upon receipt of sync detection information from the decoder 38, judges whether or not signal reception is being made properly. It also controls the digital filter 40 to select a filter coefficient.

Reference numeral 44 denotes a control portion for user's controlling operations and 45 denotes a display portion. A front panel of the DSR receiver with the control portion 44 and the display portion 45 provided thereon is shown in FIG. 7.

In the control portion 44, there are provided a power supply key 50, program type selector keys 51 being 16 in number, channel selector keys 52 being 16 in number (numeric keys from 1 to 16), an up/down key 53 for specifying a receive frequency block, a frequency/clear key 54 for direct frequency inputting and canceling registered setting, a monaural mode key 55 for selecting output condition of monaural broadcast, an up/down key 56 for fine adjustment of the receive frequency, a music balance key 57 and a speech balance key 58 for setting the M/S mode, and a memory key 59 for causing receive frequency blocks to be stored. There are further provided therein a display mode key 60 for switching the display, a direct frequency inputting key 61, an LNC power key 62, etc. Operational information from each key is input to the controller 43 and the controller 43 in turn controls each portion corresponding to the operational information.

A user selects a receive frequency block preset for example in the data RAM 43 M by operating the up/-down key 53 or specifies a receive frequency by using the direct frequency inputting key 61, the numeric keys (channel selector keys) 52, and the frequency/clear key 54. Then, the controller 43 controls the high-frequency portion 33 so that signal receiving operation according to the specified frequency is performed, or, in accordance with the user's operation with the channel selector key 52, selects an output channel from the received 16 channels and controls the output of the decoder 38. Setting and registration of the receive frequency blocks is carried out by using the up/down keys 53 and 56, etc. for specifying the frequency and using the memory key 59 for execution. For example, 20 receive frequency blocks can be registered in the data RAM 43. The data which can be registered includes the power supply voltage value to the LNC 10, in addition to the receive frequencies.

When a program type is selected by the program type selector key 51, the controller 43 discriminates the broadcasting channel corresponding to the program type among those in the above described service frame and thereupon automatically selects for example the channel having the smallest channel number in the discriminated frequency block. When there are a plurality of channels of the corresponding type in the 16 channels being received, by repeatedly pushing the same program type selector key 51, the channels of the corresponding program type are successively selected in ascending sequence.

Further, by operating the M/S mode keys 57 and 58, the user can set the ratio between volumes in the music mode and the speech mode, and the controller 43, depending on the M/S mode recognized in the selected channel, executes output volume control according to the setting.

As the display portion 45, there is provided a display area 64 formed for example of a liquid crystal panel, on which various operating statuses are displayed under the control of the controller 43.

Figure 8:
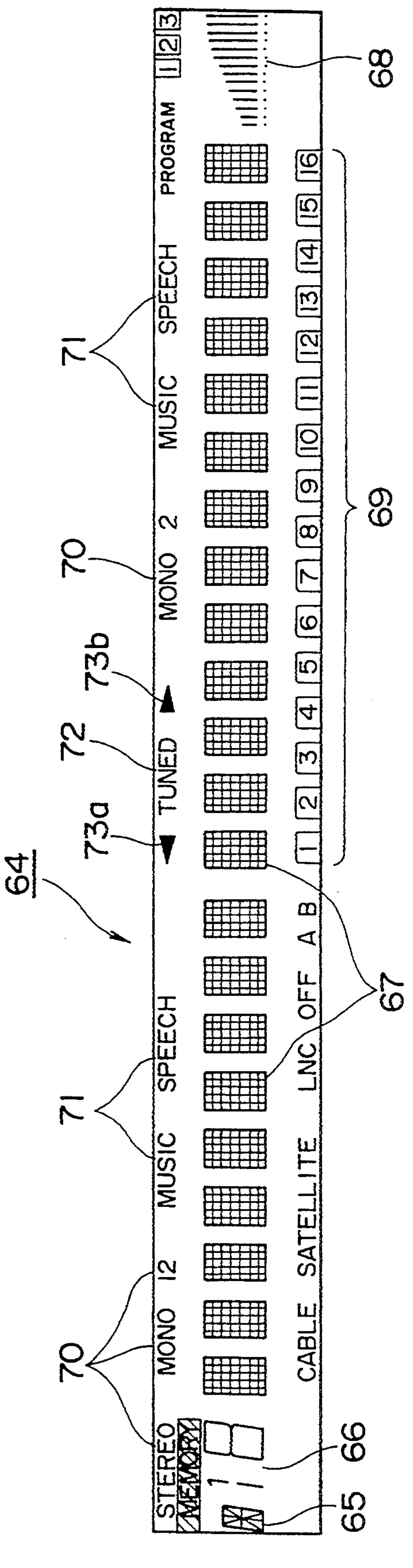
FIG. 8 is a front view of the display portion of the DSR receiver of the embodiment.

Displayed contents in the display area 64 are shown in FIG. 8. Namely, there are provided a block number display portion 65 of the frequency block being received, a channel number display portion 66 of the channel being selected, a dot display portion 67 displaying numeric information such as the receive frequency and character information (for example, the name of the broadcasting station, the name attached to the frequency block, etc.), and a signal level display portion 68, a channel indicating portion 69 turning on lights to indicate for example the channels corresponding to the program type specified as described above.

Further, there are provided, in the display area 64, a channel mode display portion 70 for indicating stereo/-monaural mode, an M/S mode display portion 71, a tuning-on display portion 72 emitting light when proper tuning is made to indicate the reception state, frequency up/down indicating portions **73*a* and 73*b*** indicating deviation of the receive frequency, etc.

Controlling operation performed by the controller 43 when the receive frequency block is switched in the DSR receiver of the present embodiment arranged as described above is shown in FIG. 9.

When the user switches the receive frequencies using the up/down key 53, for example, the controller 43 controls the high-frequency portion 33 so as to perform a receive frequency switching process (F101, F102), but,it is checked here whether or not the mode had been the channel select mode according to program type before the receive high frequency was switched (F103).

The channel selection mode according to program type means the channel selection mode according to specified program content type such that, when for example "NEWS" is selected using for example the program type selector key 51, the channel broadcasting a news program is automatically selected. In the program-type channel selection mode, the controller 43 searches the service frame for the channels corresponding to the specified program type and controls the decoder 38 to select a specific channel from the corresponding one or a plurality of channels.

If it is not the program-type channel selection mode, the controller 43 controls such that the first channel in the new receive frequency block is selected (F104).

If it is the program-type channel selection mode, this mode is maintained even after the receive frequency has been changed. More specifically, the controller 43 refers to the service frame obtained from the DSR broadcast signal received according to the new receive frequency (F105) and it is decided whether or not there are present any channels for the program content corresponding to the specified program type (F106). If these are present, all of the channel numbers of the channels for that program type are indicated in the channel indicating portion 69 of the display area 64 by turning on the corresponding lights (F107). If, for example, 3ch, 5ch, and 15ch are relevant, the numerals corresponding to them in the channel indicating portion 69 are indicated by emitted light.

Then, for example, channels with channel numbers in ascending sequence are specified and the relevant channel selection control signal is supplied to the decoder 38 so that for example 3ch is selected (F108).

If there is no channel giving a program content corresponding to the specified program type when the receive frequency is changed, a display indicating the fact is given in the display area 64. For example, "NEWS-NOT FOUND" is displayed in the dot display portion 67 (F109). The controller 43 controls so that no channel selection is performed and goes into a standby state (F110). In this case, it is preferred that muting control is executed so that no noise is output.

Although it is not shown in the flow chart, it may be arranged such that, if the program of a channel is changed to that corresponding to the specified program type while the controller 43 remains in the standby state, the channel is selected. Of course, when the user makes an operation with the channel selector key 52 after the receive frequency was changed, the specified channel will be selected whether or not the receiver is in the program type mode.

By following the above procedure when the receive frequency is changed, the program content which the user desires to listen to can be automatically selected even after the receive frequency has been changed, and therefore, there is no need for specifying the program type following the change of the receive frequency and hence the operation can be simplified. When there is no channel corresponding to the specified program type present in the receive signal at the new receive frequency, the display indicating the fact is provided and, in addition, no channel selecting operation is made, and therefore, the user can easily realize that there is no desired program present in the frequency block and hence the user may be urged to switch the receive frequency block to another one.

Figure 9:
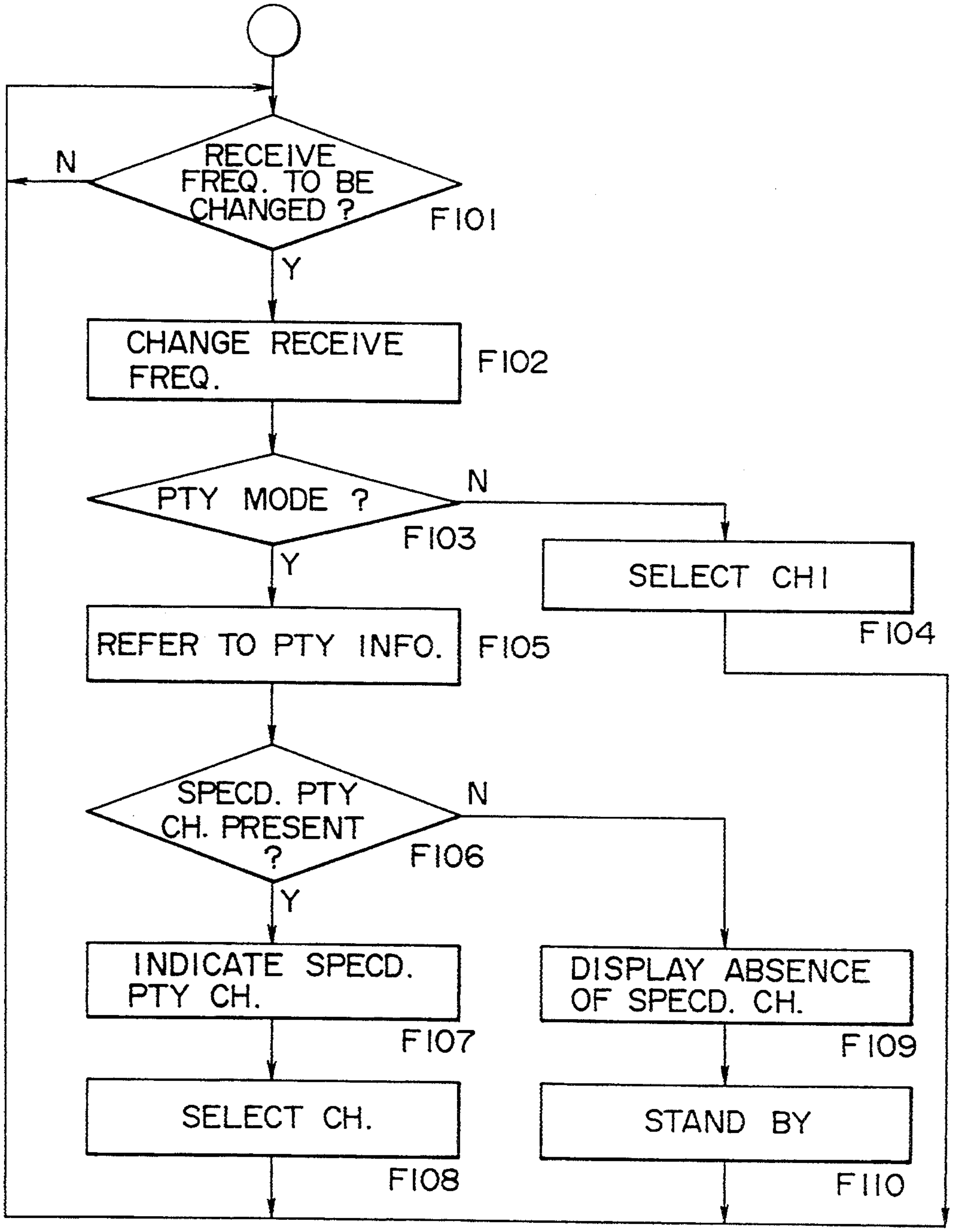
FIG. 9 is a flow chart of steps of procedure when the receive frequency is changed in the DSR receiver of the embodiment.
Figure 10:
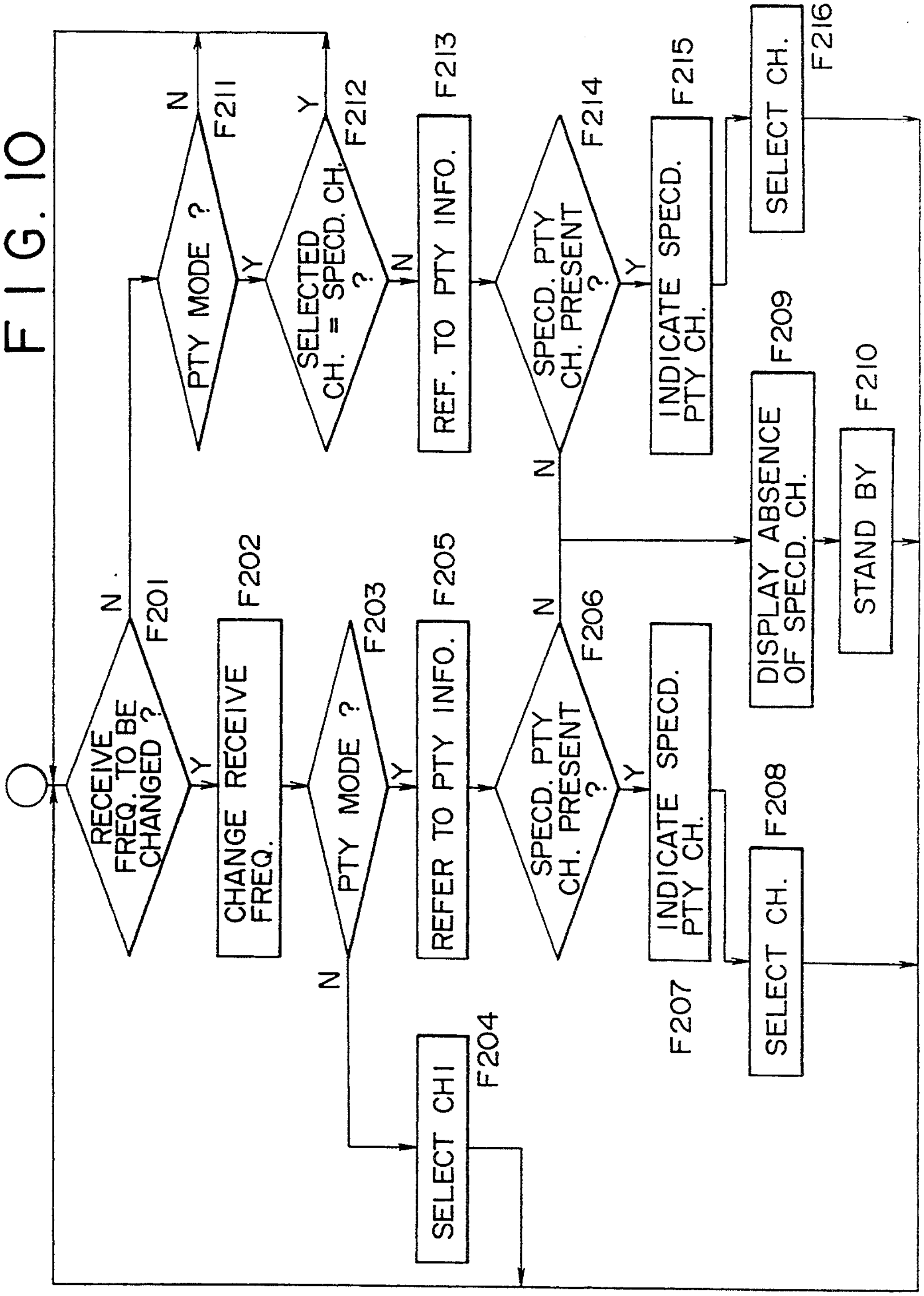
FIG. 10 is a flow chart of steps of procedure when the receive frequency is changed and a signal is received in the program type mode in the DSR receiver of the embodiment.

FIG. 10 is a flow chart showing other steps of procedure which are applicable to the DSR receiver of the present embodiment. The processes in steps F201 to F210 in this flow chart are the same as those in steps F101 to F110 of the flow chart shown in FIG. 9, duplicate description of the same will be omitted here.

The same as in the case of FIG. 9, it is arranged in this case such that the program type mode is retained even after the receive frequency is changed and, when a change is made as to the program corresponding to the specified program type while a signal at a receive frequency is being received, automatic channel selection is performed.

More specifically, when the receiver is in the program type mode, it is checked at all times whether or not the currently selected channel is of the specified program type according to the service frame (F211–F212), and when the channel becomes that not corresponding to the specified program type, for example when a program is finished and the following program is of another type of content, the PTY information for all of the channels in the service frame is referred to again (F213) and it is decided whether or not a channel for the corresponding program type is present in the 16 channels of the current receive frequency block (F214). If there are present any of the channels corresponding to the program type, these are all indicated in the channel indicating portion 69 of the display area 64 (F215) and the controller 43 specifies a channel, for example that with the smallest channel number, and supplies the decoder 38 with a channel selection control signal so that that channel is selected (F216).

When it is decided in the step F214 that there is no channel providing the program content corresponding to the specified program type, the fact is displayed in the display area 64 (F209), and the controller 43, keeping any channel selecting operation from being performed, goes into a standby state (F210), i.e., stops outputting of any of the received signals.

Also in the procedure shown in FIG. 10, when the receive frequency is changed, a channel for the program desired by the user can be automatically selected, and when the receiver is in the program type mode, a channel for the corresponding program type is found from the received channels and selected. When there is no such channel, the channel selection is stopped and a standby state is brought about, and thereby the user is effectively informed of nonexistence of the program and urged to switch the receive frequency block. It is preferred that the channel indicating portion 69 is arranged to timely switch its indication of other channels than being selected, in accordance with any changes made as to the channels for the specified program type.

Through the arrangements made as described above, operation of the receiver in the program type mode can be simplified and any confusions in operating and recognizing the status of the receiver can be avoided.

The present invention is not only applicable to the DSR receiver but also widely applicable to the receivers of broadcast systems in which broadcast signals are similarly multiplexed.

Also the structure of and processing systems in the DSR receiver when the present invention is applied to the DSR receiver are not limited to those described in the above embodiment.

In the digital broadcast receiver according to the present invention, as described in the foregoing, it is arranged such that a channel selection controlling operation in the mode established by program contents type specifying means is performed even after the receive frequency has been changed, and, further, when the selected channel becomes not corresponding to the specified program type any more, another channel corresponding to that type comes to be selected. Further, in the signal receiving operation in the specified content type mode of the receiver, in the case where any channel corresponding to the specified program content type is absent, or becomes nonexistent, when the receive frequency is changed, or while signal reception is being made at a receive frequency, it is arranged such that any channel not corresponding to the specified program is kept from being selected and the receiver is put into a standby state for channel selection, so that any broadcasts not corresponding to the specified program contents are not output.

Accordingly, the operation of the receiver in the specified content type mode is greatly simplified and the user is prevented from becoming confused in operating the receiver by a channel not specified happening to be selected and output. Further, upon noticing that the receiver is in the standby state, the user is urged to change the frequency, which is very helpful when the user is searching for a program of his desired content type. Since an indicating means for indicating the channels corresponding to the specified content type is provided on the digital broadcast receiver, the above effects are heightened.

What is claimed is:

1. A digital broadcast receiver for receiving a digital broadcast, in which a plurality of digital broadcast signals are multiplexed in a plurality of receive frequencies and information as to, at least, the type of broadcast content of each of said digital broadcast signals, as additional information, is transmitted together with said digital broadcast signals, comprising:

frequency specifying means for specifying a selected receive frequency from said plurality of receive frequencies, said selected receive frequency being multiplexed from a first plurality of digital broadcast signals;

content type specifying means for specifying a desired first type of broadcast content; and control means for controlling signal reception of said selected receive frequency specified by said frequency specifying means and controlling such that a first digital broadcast signal having said first type of broadcast content specified by said content type specifying means is identified among and selected from said first plurality of digital broadcast signals received at said selected receive frequency, wherein when a new receive frequency multiplexed from a second plurality of digital broadcast signals is specified by said frequency specifying means, said control means controls signal reception of said new receive frequency and wherein if said first type of broadcast content was specified by said content type specifying means before said new receive frequency was specified by said frequency specifying means, said control means controls such that a second digital broadcast signal having said first type of broadcast content specified by said content type specifying means is selected from said second plurality of digital broadcast signals received at said new receive frequency.

2. A digital broadcast receiver according to claim 1, wherein if said first digital broadcast signal having said first type of broadcast content specified by said content type specifying means is present in said second plurality of digital broadcast signals received at said new receive frequency, said first digital broadcast signal is selected, and if said first type of broadcast content specified by said content type specifying means is not present in said second plurality of digital broadcast signals, channel selection is not performed.

3. A digital broadcast receiver according to claim 1, further comprising a display means for displaying, when said new receive frequency has been specified by said frequency specifying means and signal reception of said new receive frequency has been performed, channels for digital broadcast signals corresponding to said first type of broadcast content specified by said content type specifying means before said new receive frequency has been changed and selected from said second plurality of digital broadcast signals received at said new receive frequency.

4. A digital broadcast receiver according to claim 1, wherein if said first type of broadcast content changes during reception of said first digital broadcast signal, said control means is adapted to control such that another digital broadcast signal having said first type of broadcast content specified by said content type specifying means and present in said second plurality of digital broadcast signals is selected.

* * * * *